Dec. 29, 1959 A. K. DIETRICH 2,919,322

LOW NOISE CONTACT MODULATOR

Filed Oct. 1, 1958

ARNOLD K. DIETRICH
INVENTOR

BY Irving Kayton
ATTORNEY

United States Patent Office 2,919,322
Patented Dec. 29, 1959

2,919,322

LOW NOISE CONTACT MODULATOR

Arnold K. Dietrich, Binghamton, N.Y., assignor to Link Aviation, Inc., Binghamton, N.Y., a corporation of New York Application October 1, 1958, Serial No. 764,626
10 Claims. (Cl. 200—90)

Figure 1:
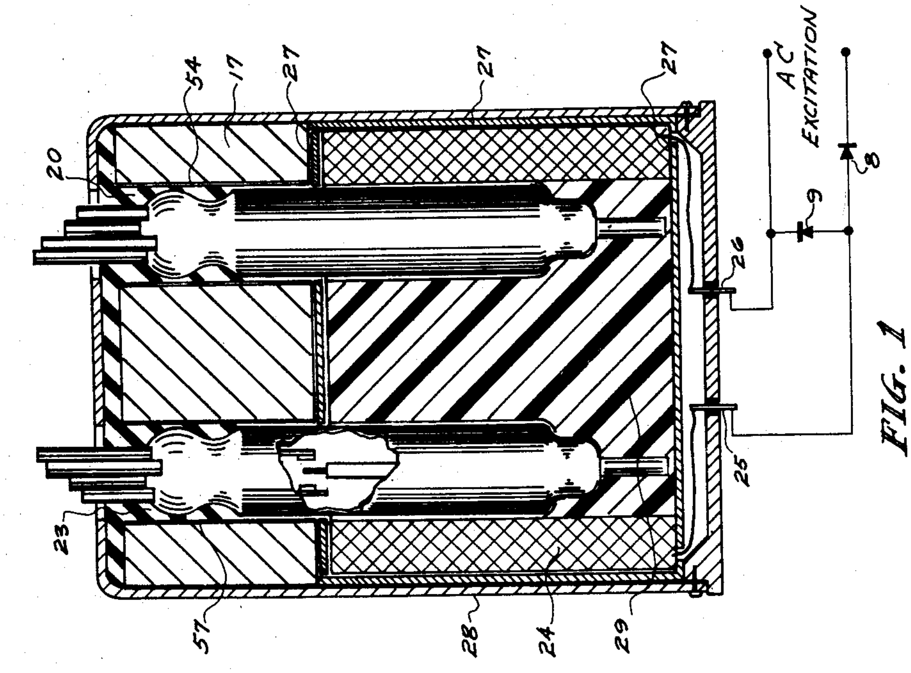

This invention relates to electromagnetic switches, and more particularly to such switches wherein a solenoid-excited oscillating magnetic field actuates a magnetic armature to make and break electrical contact for circuit controlling purposes.

In D.C. electrical analog computing systems, driftless D.C. amplification is usually provided at the many places requiring it in such systems, by A.C. amplifiers which take their inputs from choppers whose function is the conversion of the D.C. signal into an A.C. signal acceptable by the amplifier. Subsequent to amplification the output of the amplifier is demodulated and the D.C. signal is recovered. The chopper providing the D.C. to A.C. conversion is one of the important applications of the electromagnetic switches mentioned above. Although purely electronic choppers are known in the art, they themselves are often subject to drift, or do not operate efficiently at conventional operating frequencies. As a consequence, the choppers used in analog computing systems are almost exclusively of the type wherein an A.C. excited solenoid actuates an armature which mechanically makes and breaks electrical contact.

Mercury-wetted contact switch elements, because of their well-known advantages such as extremely long life, low contact resistance, absence of contact chatter, and freedom from thermal voltages, are particularly attractive for use in the abovementioned choppers. However, the driving of a high gain ampilfier by a mercury-wetted contact chopper presents a considerable problem. It is characteristic of such amplifiers that very low signal strengths usually are involved. Unfortunately, it is characteristic of the mercury-wetted switch elements now commercially available, that relatively large noise voltages are induced into the signal carrying or contact leads of the chopper and thus into the load circuit by the driving voltage exciting the solenoid of the switch. These noise voltages are large relative to the normal operating signal level of the amplifier. In order to effectively employ the high gain amplifier, a low noise level chopper must be utilized; in order to utilize the advantages of a mercury-wetted contact chopper, means must be developed for substantially lowering the noise level induced therein by the A.C. voltage exciting the solenoid.

There are electromechanical choppers known in the art having, in fact, very low noise voltages in operation. These choppers are of the type wherein noble element contact switch elements are utilized; the solenoid and armature are in general located a considerable distance from the contacts and lead wires so that the magnetic fields generated by the solenoid are at a considerable distance from the contacts. Furthermore, large elements of high permeability material shield the solenoid, and are located between the solenoid and the contacts and lead wires. Although these structural techniques result in satisfactorily low noise voltages, these choppers do not have many of the advantages of the mercury-wetted contact switching devices. Most importantly, they are not comparable in length of life and absence of contact chatter.

The problem still remains, therefore, as to how to decrease the noise voltage in a mercury-wetted contact chopper. One approach would be to construct the mercury-wetted contact switch elements which are used in the chopper in accordance with the structural techniques used in the above-mentioned chopper utilizing the prior art noble element contact switch elements. Thus a mercury-wetted switch element could be made wherein the solenoid is remote from the contacts and their leads, and wherein large blocks of high permeability shielding material is introduced therebetween. This would require the total reconstruction of the presently known mercury-wetted contact switch elements, since such devices are not commercially available. But manufactures of equipment requiring the type of chopper which has the characteristics of long life, absence of contact chatter, and low noise voltage are not often in the position to profitably or efficiently manufacture their own mercury-wetted contact switching elements. In a large analog computing system such as is employed with flight simulating systems for grounded aircraft trainers, hundreds of such choppers may be required; minimization of cost and maximization of efficiency are imperative under such circumstances. Consequently, the use of commercially available mercury-wetted contact switch elements is indicated with means for reducing the noise voltage.

It is the main object of this invention to provide chopper action characterized by low noise voltage.

The major advantages of this invention are that the above object is accomplished by structure which is characterized by long life and absence of contact chatter, and the switching element of which is commercially available.

The above object is attained, and advantages provided, in accordance with the invention by utilizing a shielding structure which does not rely upon its permeability for deviating the magnetic lines of force from the region wherein the contacts and leads are located, but which provides a compensating field which is substantially equal in strength and precisely opposite in sense to the magnetic field excited by the solenoid. More specifically, an element of non-magnetic but highly conductive metallic material is arranged so as to circumscribe, and form a closed conductive loop about, the contacts and contact leads of the chopper switch which may be a standard type of switching element. The circumscribing conductive boundary forms a conductive loop which is oriented such that any stray magnetic field from the solenoid serves to excite a current in the conductive loop which in turn generates a magnetic field of polarity opposite to that of the exciting stray magnetic field and of magnitude substantially equal thereto. As a consequence, the region circumscribed by the conductive loop, that is the region wherein the contacts and their lead wires are located, is substantially free of undesired oscillating magnetic field components; this results in considerable reduction of the noise voltage ordinarily induced in the contact wires.

A particularly desirable feature of the invention resides in that the circumscribing conductive boundary may be formed by boring a substantially cylindrical hollow into a relatively large block of conductive material. A multiplicity of such hollow bores may be produced in the same block, close to each other, such that a multiplicity of mercury-wetted switching elements may be located therein. The single conductive block thus provides the required shielding effect for many switches, and chopping for many amplifiers may be provided by a compact structure.

The generation of compensating magnetic field components substantially eliminates the induced noise voltage due to low frequency driving voltages applied to the solenoid. Where, however, high frequency driving voltages are utilized, the large conductive block of virtue of its high conductivity and large volume will preclude the transfer of electromagnetic field components into the bores merely by virtue of the fact that such high frequency electromagnetic fields, by their very nature will not penetrate a highly conductive boundary. Thus the shielding provided is effective by its very nature, in precluding, by different mechanisms, the generation of noise voltages due to both low and high frequency driving voltages.

Another feature of the invention, which contributes to keeping the noise voltage low, is the electrical characteristic of the armature of the chopper. The armature, in accordance with the invention, is in no way connected to the electrical circuit and never carries a D.C. signal. A bridging element of non-magnetic conductive material is mechanically linked at one end to the armature, and at the other end serves to connect two contacts and close the circuit. Thus the A.C. driving voltage to the solenoid may never be coupled to a D.C. intelligence bearing signal in the armature, since the armature never carries a D.C. signal.

Figure 2:
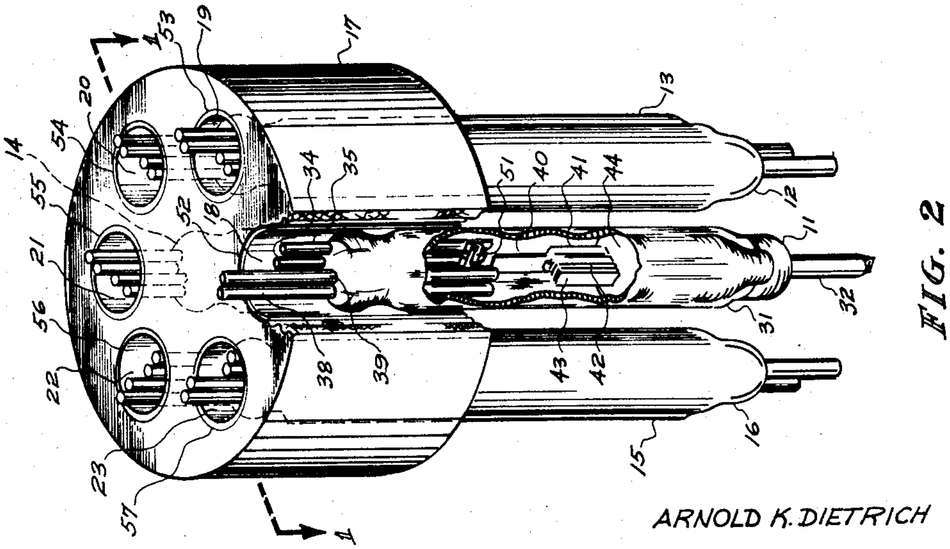

Other objects and various advantages and features of the invention will become apparent by reference to the accompanying drawings and the following description thereof. In the drawings:

Fig. 1 is a cross-sectional view of a multiple-switch mercury-wetted contact chopper involving the principles of the invention; and Fig. 2 is a partially cut-away perspective view of an essential portion of the chopper of Fig. 1.

The multiple element chopper, shown by way of example, to illustrate the principles of the invention, comprises six mercury-wetted contact switching elements 11 through 16. The details of the construction of these switches will be presented below. A cylindrical block 17 of highly conductive metallic material, which may be for example, of aluminum or copper, has disposed therein six hollow cylindrical bores 18 through 23 disposed parallel to the vertical axis of the block 17 and arranged equally spaced apart around a circle having the longitudinal axis as a center point. The hollow bores 18 through 23 each receive one of the switches 11 through 16. It may be noted that the vertical length of the cylinder 17 is only approximately half that of the length of the switch elements 11 through 16. The physical relationship between the switch elements 11 through 16 and the block 17 is of importance in the invention and will be considered in greater detail below. A solenoid 24 surrounds all of the switch elements 11 through 16 and is arranged below block 17 so as to apply a magnetic field parallel to the longitudinal axes of each of switch elements 11 through 16. Terminals 25 and 26 are attached to solenoid 24, whereby an A.C. driving voltage may be applied thereto. Half wave rectification is provided by diode 8; suppressor diode 9, shunting terminals 25 and 26, serves to eliminate the spike in the noise voltage that would result with the interruption of the solenoid current. An empty cylindrical container 27 made of high permeability material serves to surround and enclose solenoid 24. It may be noted that the high permeability shielding cylinder 27 totally encloses the solenoid 24 and presents a closed chamber except in those regions wherein bores 18 through 23 penetrate its top wall. The volume remaining about the switch elements 11—16 within the high permeability shield 27 and between them and the solenoid 24 is completely filled by a solid wax material 29 which holds all of the switch elements rigidly and inflexibly in place relative to solenoid 24 and magnetic shielding cylinder 27. Completely enclosing the entire structure thus described is a casing

28 of high permeability material with holes in the top wall thereof, permitting the extension of switch elements 11—16 therethrough.

Considering the switching element 11 in greater detail it may be seen that it is of the well known type which is commercially available and is disclosed, for example, in the U.S. Patent No. 2,732,459 which issued to C. E. Pollard, Jr., on January 24, 1956. It comprises a glass envelope 31 into which a metal tube 32 is sealed at the bottom. This metal tube is for the usual purpose of exhausting the air from the envelope introducing the mercury and later pumping the tube full of hydrogen gas at high pressure. Into the upper end of the glass tube 31 there are sealed four wires of nickel-iron material which form the exterior terminals of the switch element 11 and to which contacts are secured within the envelope. The wires 34 and 35 constitute the back contacts of the switch element and have pieces of contact metal 36 and 37, respectively, attached thereto. Similar wires 38 and 39 are used for the front contacts and are somewhat longer so as to provide a low reluctance circuit contiguous to the armature piece 40. The armature piece 40 is attached through the use of a light spring 41 to the metal tube 32. A mercury solution (which may include copper as disclosed in the above mentioned U.S. Patent 2,732,459), which forms a pool or reservoir 44 at the bottom of the glass envelope 31, rises through capillary action through the space provided between the spring 41 and the plates 42 and 43 and further in the wick 51 made of two parallel wires having their upper ends bent into a T-shaped piece to form a contact cooperating with the two back contacts 36 and 37 and with the two front contacts similarly attached to the wires 38 and 39. Although the armature 40 is made of highly magnetic material, the T-shaped contact 51 is of non-magnetic highly conductive metal which may be, for example, platinum.

The four exterior terminals 34, 35, 38 and 39 of switch element 11 may be wired such that switch 11 drives two amplifiers. Thus, for example, contact leads 34 of the back contacts and 38 of the front contacts, may be grounded or fixed to some reference potential while contact leads 35 of the back contacts, and 39 of the front contacts, may be coupled respectively to two different amplifiers. It may be noted that the armature 40 itself is in no way coupled to the contact circuit but is mechanically terminated within the switch element and is in this way substantially isolated from the output terminals. Thus the armature cannot serve as a means for coupling the driving voltage exciting the solenoid to the information bearing D.C. drift signal propogating along the contact leads 34—35 and 38—39, since the armature itself does not at any time carry a D.C. signal.

The operation of the chopper comprising the switch elements 11 through 16 may now be considered. A driving A.C. voltage is half-wave rectified by diode 8 and is applied to terminals 25 and 26 of solenoid 24, whereby an oscillating magnetic field is excited within the space surrounded by solenoid 24. The armatures of the various switch elements are within this oscillating magnetic field and consequently vibrate back and forth to alternately make and break the circuits with their respective T-shaped contacts through the front and back contacts coupled to the external contact lead wires. The high permeability cylinder 27 serves as a magnetic shield to keep the oscillating magnetic field excited by solenoid 24 within the volume which it defines. Shield 27 operates in manner well known in the art, by deviating the magnetic lines of force from regions of lower permeability to itself, by virtue of its higher permeability. In this way the magnetic field is confined within a specified volume. It is the case, however, that magnetic shielding material, once saturated, is no longer sufficient to keep all of the magnetic field within its own boundaries. Accordingly some magnetic field will escape from the region defined by cylinder 27 and serve to generate outside of this region, and within the switch element contacts, a noise voltage which is essentially induced by the A.C. potential driving the solenoid 24. However, the stray magnetic field which would ordinarily penetrate into the bores of cylinder conductive block 17 containing the switch elements 11 through 16 will, in their oscillations, cut across the conductive boundaries formed by the inside faces of block 17 forming the bores 18—23. The cutting of these conductive boundaries by the stray magnetic lines of force serves to generate short circuited ring currents around the conductive boundaries of the bores. The short circuit ring currents thus generated in turn serve to excite magnetic field components within the bores which are of opposite polarity to the stray magnetic field components which initially induced the ring currents. As a consequence, the magnetic field components are effectively substantially cancelled. Thus the noise voltage which would ordinarily be induced in the contact leads of the switch elements 11 through 16 is precluded from being generated by the compensating magnetic field. To fully shield switch elements 11 through 16 the conductive block 17 is arranged to extend down to the bottom of contact leads 38 and 39 so that a conductive boundary is provided about all portions of the contact leads.

Thin hollow cylindrical elements 52—57 of high permeability material may be, in addition, inserted inside the bores 18—23 and surrounding the switch elements 11 through 16 so as to further remove from the bores 18 through 23 any stray magnetic field components still remaining in those regions.

The results of the invention in improving chopper operation have been dramatically demonstrated in several successful reductions to practice. Thus in a chopper as described in Figs. 1 and 2, wherein the A.C. driving excitation averaged 6.3 volts, 180 milliamperes, the average noise voltage induced at 60 cycle operation averaged 20 microvolts at 100,000 ohms of output load impedance. This compares with an average of over 300 microvolts at the same output impedance for a standard type mercury-wetted contact relay switch commercially available. It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In an electromagnetic switch of the type employing engageable circuit controlling contacts and leads connected thereto within a container and a means for magnetically actuating an armature to engage and disengage said contacts, a non-magnetic conductive metallic means for generating magnetic field components in a region including at least a portion of said contacts and contact leads, said magnetic field components having polarity opposite to magnetic field components within said region due to said first means.

2. A switch as recited in claim 1 wherein said magnetic field generating means comprises a non-magnetic highly conductive boundary circumscribing the major portion of said contacts and leads disposed within said container to form a closed conductive loop thereabout.

3. A switch as recited in claim 2 wherein said armature is electrically isolated from the circuit controlled by said contacts.

4. An electromechanical chopper comprising a block of non-magnetic highly conductive material having a plurality of hollow bores therein, a mercury-wetted contact switching element disposed partially within each of said hollow bores, each of said switch elements having a plurality of contacts and leads connected thereto and an armature, said switch elements being disposed relative to said block to include at least a portion of said contacts and leads within said bores, and a solenoid arranged to drive said armature.

5. A chopper as recited in claim 4 wherein each of said switch elements includes two front and two back contacts, means coupling one each of said front and back contacts to a common reference potential, and means coupling the remaining contacts to two electronic amplifiers, respectively, whereby each said switch element drives two amplifiers, said armature being disposed within said switch element in electrical isolation from said amplifiers.

6. A chopper as recited in claim 4 wherein the inside conductive boundaries of said block comprising said bores are disposed in the path of oscillating lines of magnetic force in said bores from said solenoid, and said conductive boundaries are oriented relative to said solenoid to generate magnetic lines of force of opposite polarity from those of said solenoid within said bores.

7. In combination, a mercury-wetted contact relay having two contacts and contact leads affixed thereto, said contacts being electrically fixed at different levels of potential, magnetically actuated means for conductively coupling said contacts, means for magnetically actuating said coupling means, first means for magnetically isolating said contacts and leads from said actuating means comprising a sheath of high permeability material surrounding said contacts and leads, and second means for providing said isolation comprising a non-magnetic highly conductive metallic member circumscribing said contacts and leads.

8. A combination as recited in claim 7 wherein said second means is disposed relative to said actuating means to generate magnetic lines of forces within the region circumscribed by said second means of opposite polarity to any magnetic lines of force due to said actuating means undesirably disposed within said region.

9. A combination as recited in claim 7 wherein said second means comprises a cylindrical block of aluminum with a hollow bore therein, and said relay is disposed at least partially within said bore.

10. A combination as recited in claim 9 wherein a high permeability sheath is disposed within said bore surrounding said relay.

References Cited in the file of this patent

UNITED STATES PATENTS

| | | |
|---|---|---|
| 2,187,115 | Ellwood et al. | Jan. 16, 1940 |
| 2,289,830 | Ellwood | July 14, 1942 |
| 2,318,405 | Leveridge | May 4, 1943 |
| 2,378,986 | Dickten | June 26, 1945 |
| 2,519,463 | Harrison | Aug. 22, 1950 |